United States Patent
Dasgupta et al.

(10) Patent No.: US 12,436,334 B2
(45) Date of Patent: Oct. 7, 2025

(54) PHOTONICS CHIP STRUCTURES INCLUDING A LIGHT SOURCE AND AN EDGE COUPLER

(71) Applicant: GlobalFoundries U.S. Inc., Malta, NY (US)

(72) Inventors: Arpan Dasgupta, Beacon, NY (US); Zahidur Chowdhury, New Windsor, NY (US); Takako Hirokawa, Ballston Lake, NY (US); Vaishnavi Karra, Hopewell Junction, NY (US); Norman Robson, Fishkill, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 294 days.

(21) Appl. No.: 18/141,753

(22) Filed: May 1, 2023

(65) Prior Publication Data

US 2024/0369760 A1    Nov. 7, 2024

(51) Int. Cl.
*G02B 6/12* (2006.01)
*F21V 8/00* (2006.01)
*G02B 6/136* (2006.01)
*H04N 5/33* (2023.01)

(52) U.S. Cl.
CPC ....... *G02B 6/12004* (2013.01); *G02B 6/0016* (2013.01); *G02B 6/136* (2013.01); *H04N 5/33* (2013.01); *G02B 2006/12121* (2013.01); *G02B 2006/12147* (2013.01)

(58) Field of Classification Search
CPC .. G02B 6/0016; G02B 6/4228; G02B 6/4231; G02B 6/4236
See application file for complete search history.

(56) References Cited

U.S. PATENT DOCUMENTS

| | | | |
|---|---|---|---|
| 9,625,717 B2 * | 4/2017 | Sunnari | G02B 5/1823 |
| 11,499,923 B2 | 11/2022 | Curtin | |
| 11,650,372 B2 * | 5/2023 | Schreiber | G02B 6/34 385/37 |

(Continued)

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

(Continued)

*Primary Examiner* — Charlie Y Peng
(74) *Attorney, Agent, or Firm* — Thompson Hine LLP; Anthony Canale

(57) ABSTRACT

Structures including a light source and an edge coupler, and methods of forming and using such structures. The structure comprises a semiconductor substrate and a back-end-of-line stack on the semiconductor substrate. The back-end-of-line stack includes a first dielectric layer, a first plurality of metal features in the first dielectric layer, a second dielectric layer on the first dielectric layer, and a second plurality of metal features in the second dielectric layer. The second plurality of metal features have a non-overlapping relationship with the first plurality of metal features. The structure further comprises an edge coupler adjacent to the first plurality of metal features and the second plurality of metal features.

20 Claims, 9 Drawing Sheets

(56) References Cited

U.S. PATENT DOCUMENTS

| | | | | |
|---|---|---|---|---|
| 2005/0040317 A1* | 2/2005 | Yaung | ............... | H10F 39/806 250/214.1 |
| 2010/0091369 A1* | 4/2010 | Hoose | ............... | G02B 5/1857 359/576 |
| 2014/0193115 A1* | 7/2014 | Popovic | ............... | G02B 6/124 385/14 |

OTHER PUBLICATIONS

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020. 9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

* cited by examiner

PHOTONICS CHIP STRUCTURES INCLUDING A LIGHT SOURCE AND AN EDGE COUPLER

BACKGROUND

The disclosure relates to photonics chips and, more specifically, to structures including a light source and an edge coupler, and methods of forming and using such structures.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source.

A light source, such as an optical fiber or a laser, may be coupled by an edge coupler, also known as a spot-size converter, to a photonics chip. The edge coupler couples light of a given mode from the light source to a photonic integrated circuit on the photonics chip. The edge coupler may include a waveguide core that defines an inverse taper having a tip that is positioned adjacent to an edge of a cavity in which the light source is situated. The gradually-varying cross-sectional area of the inverse taper supports mode transformation and mode size variation associated with mode conversion when light is transferred from the light source to the edge coupler.

An optical fiber may be provided as a light source that is seated in the cavity adjacent to the edge coupler. Conventional non-destructive testing techniques, such as X-ray tomography, can be used to image the optical fiber and the edge coupler in order to diagnose any misalignment between the core of the optical fiber and the edge coupler. Misalignment between the edge coupler and the core of the optical fiber results in light loss that degrades the efficiency of the light transfer.

Improved structures including a light source and an edge coupler, and methods of forming and using such structures, are needed.

SUMMARY

In an embodiment of the invention, a structure for a photonics chip is provided. The structure comprises a semiconductor substrate and a back-end-of-line stack on the semiconductor substrate. The back-end-of-line stack includes a first dielectric layer, a first plurality of metal features in the first dielectric layer, a second dielectric layer on the first dielectric layer, and a second plurality of metal features in the second dielectric layer. The second plurality of metal features have a non-overlapping relationship with the first plurality of metal features. The structure further comprises an edge coupler adjacent to the first plurality of metal features and the second plurality of metal features.

In an embodiment of the invention, a method of forming a photonics chip is provided. The method comprises forming an edge coupler on a semiconductor substrate, forming a first dielectric layer of a back-end-of-line stack on the semiconductor substrate, forming a first plurality of metal features of the back-end-of-line stack in the first dielectric layer, forming a second dielectric layer of the back-end-of-line stack on the first dielectric layer, and forming a second plurality of metal features of the back-end-of-line stack in the second dielectric layer. The second plurality of metal features have a non-overlapping relationship with the first plurality of metal features, and the edge coupler is formed adjacent to the first plurality of metal features and the second plurality of metal features.

In an embodiment of the invention, a method comprises directing light from a light output of a light source to an edge coupler, capturing a first portion of the light with the edge coupler, redirecting a second portion of the light from a plurality of metal features adjacent to the edge coupler, generating an image from the second portion of the light, and determining a placement of the light output of the light source relative to the edge coupler from an analysis of the image.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
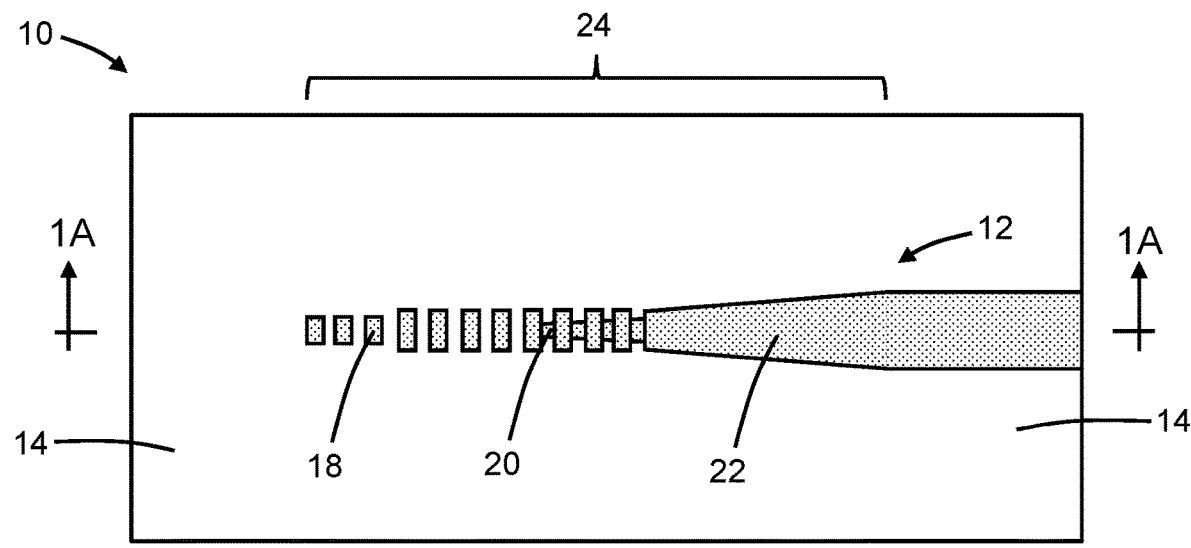
FIG. 1 is a top view of a structure at an initial fabrication stage of a processing method in accordance with embodiments of the invention.
Figure 1A:
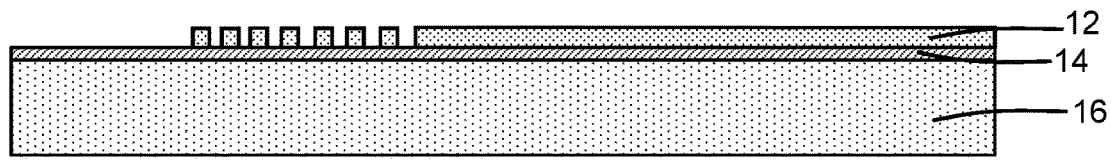
FIG. 1A is a cross-sectional view taken generally along line 1A-1A in FIG. 1.

With reference to FIGS. 1, 1A and in accordance with embodiments of the invention, a structure 10 for a photonics chip includes a waveguide core 12 that is positioned on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate. The waveguide core 12 is separated from the semiconductor substrate 16 by the dielectric material of the intervening dielectric layer 14. The dielectric layer 14 adjoins the semiconductor substrate 16 along an interface, and the dielectric layer 14 has an upper surface on which the waveguide core 12 is positioned. In an alternative embodiment, one or more additional dielectric layers comprised of, for example, silicon dioxide may be positioned between the waveguide core 12 and the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon, amorphous silicon, or polysilicon. In an alternative embodiment, the waveguide core 12 may be comprised of a dielectric material, such as silicon nitride, silicon oxynitride, or aluminum nitride.

In an embodiment, the waveguide core 12 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shape of the waveguide core 12. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer comprised of the material (e.g., silicon nitride).

The waveguide core 12 may include segments 18, a rib 20 that overlaps with some of the segments 18, and a section 22 that is positioned adjacent to the segments 18 and rib 20. The segments 18, rib 20, and section 22 of the waveguide core 12 may define an edge coupler 24. In an embodiment, the edge coupler 24 may have an end or facet defined by the segment 18 that is most distant from the section 22. The section 22 of the waveguide core 12 may be connected to a photonic integrated circuit on the photonics chip. In an embodiment, the edge coupler 24 may be configured to receive light from an optical fiber that is routed by the waveguide core 12 to the photonic integrated circuit on the photonics chip and/or light may be routed from the photonic integrated circuit by the waveguide core 12 to the edge coupler 24 for transfer from the photonics chip to the optical fiber.

In alternative embodiments, the edge coupler 24 may have a different configuration. For example, the segments 18, rib 20, and section 22 of the waveguide core 12 may be replaced by a solid inverse taper characterized by one or more taper angles.

Figure 2:
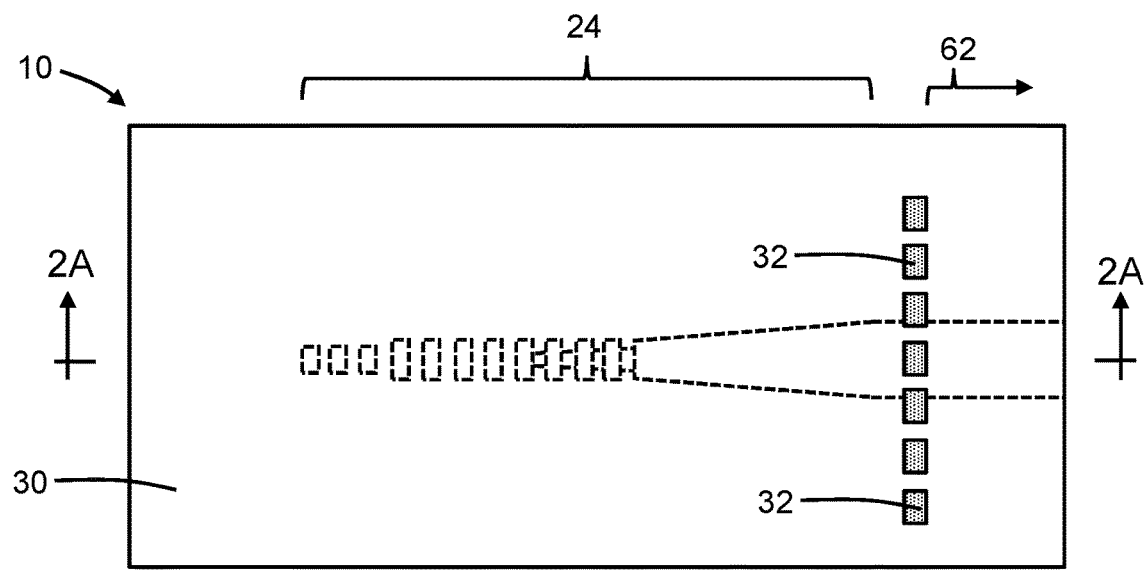
FIG. 2 is a top view of the structure at a fabrication stage of the processing method subsequent to FIG. 1.
Figure 2A:
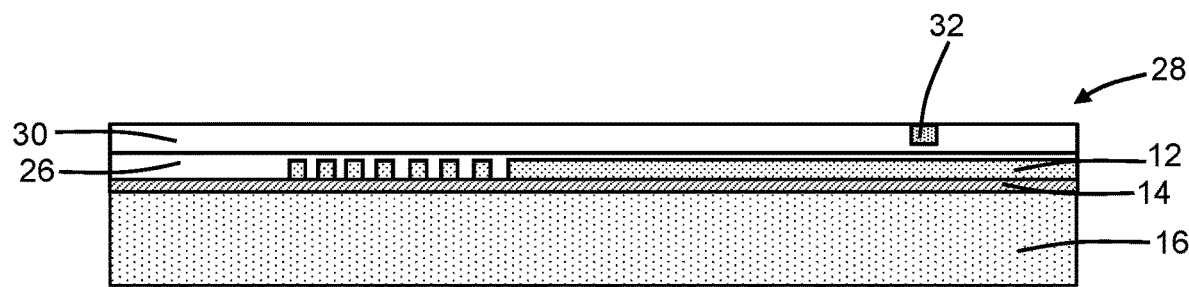
FIG. 2A is a cross-sectional view taken generally along line 2A-2A in FIG. 2.

With reference to FIGS. 2, 2A in which like reference numerals refer to like features in FIGS. 1, 1A and at a subsequent fabrication stage, a dielectric layer 26 may be formed over the waveguide core 12, and the waveguide core 12 may be embedded in the dielectric layer 26. The dielectric layer 26, which may be comprised of a dielectric material such as silicon dioxide, may fill the spaces between the segments 18 of the edge coupler 24.

A back-end-of-line stack 28 may be formed on the semiconductor substrate 16 with the dielectric layer 14 and the dielectric layer 26 as intervening low-index cladding for the waveguide core 12. The back-end-of-line stack 28 may include a metallization level having a dielectric layer 30 and metal features 32 that are formed by, for example, a damascene process as non-functional metal fill in the dielectric layer 30. In an embodiment, the dielectric layer 30 may be comprised of a dielectric material, such as silicon dioxide, and the metal features 32 may be comprised of a metal, such as copper.

The metal features 32 may be arranged in a row, and the metal features 32 may be spaced apart in the row with a given pitch. In an embodiment, the row including the metal features 32 may be aligned transverse to the length of the waveguide core 12. The metal features 32 have a non-overlapping relationship with the edge coupler 24. An exclusion area 62 is defined adjacent to the row of metal features 32, the dielectric layer 30 is free of metal features in the exclusion area 62, and the metal features 32 are positioned along the length of the waveguide core 12 between the edge coupler 24 and the exclusion area 62.

Figure 3:
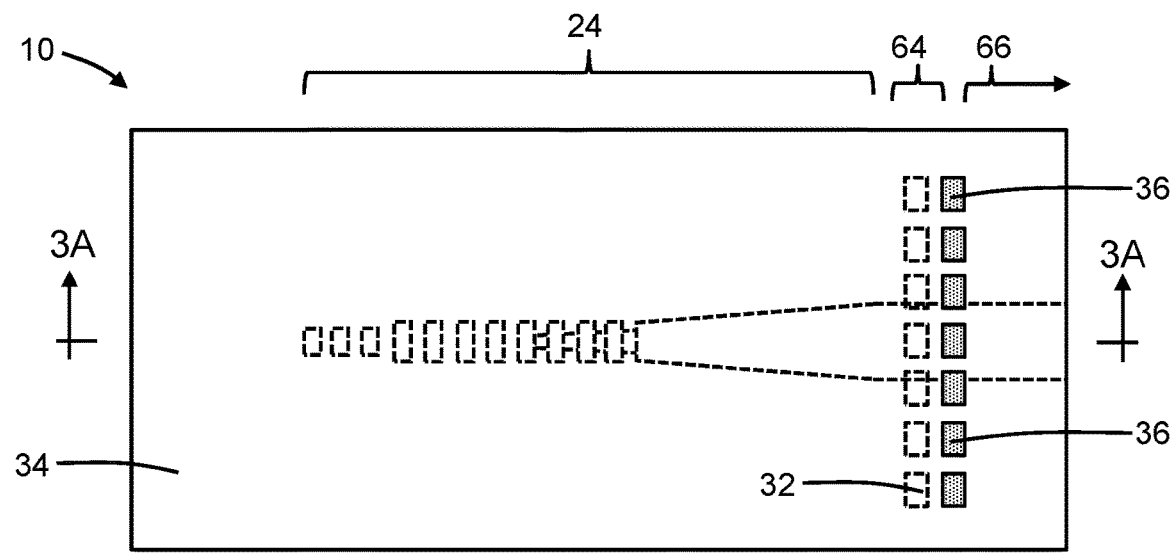
FIG. 3 is a top view of the structure at a fabrication stage of the processing method subsequent to FIG. 2.
Figure 3A:
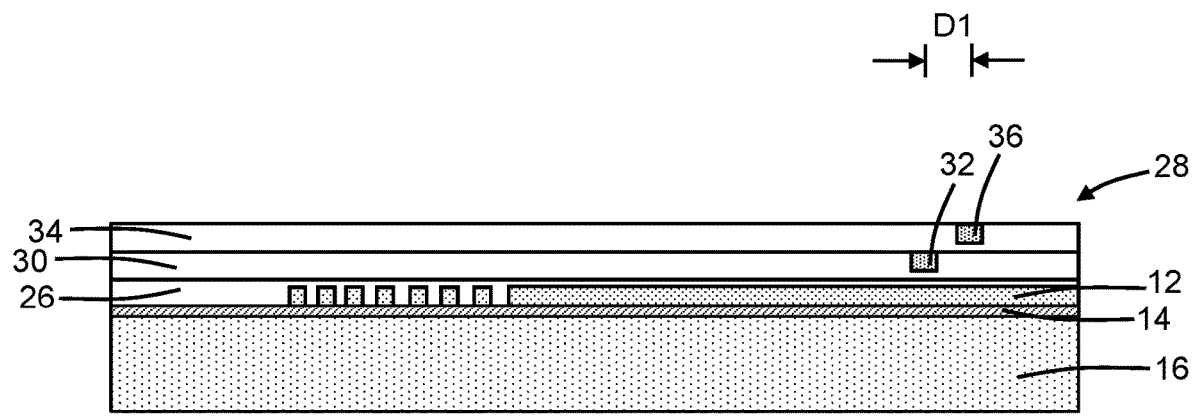
FIG. 3A is a cross-sectional view taken generally along line 3A-3A in FIG. 3.

With reference to FIGS. 3, 3A in which like reference numerals refer to like features in FIGS. 2, 2A and at a subsequent fabrication stage, the back-end-of-line stack 28 may further include a metallization level having a dielectric layer 34 positioned on the dielectric layer 30 and metal features 36 that are formed by, for example, a damascene process as non-functional metal fill, in the dielectric layer 34. In an embodiment, the dielectric layer 34 may be comprised of a dielectric material, such as silicon dioxide, and the metal features 36 may be comprised of a metal, such as copper.

The metal features 36 may be arranged in a row, and the metal features 36 may be spaced apart in the row with a given pitch. In an embodiment, the row including the metal features 36 may be aligned parallel or substantially parallel to the row including the metal features 32. The metal features 32 are positioned in elevation between the metal features 36 and the semiconductor substrate 16. In an embodiment, the row including the metal features 36 may be aligned transverse to the length of the waveguide core 12. The row including the metal features 36 may be offset by a distance D1 (for example, a center-to-center distance) from the row including the metal features 32. The metal features 36 have a non-overlapping relationship with the metal features 32, as well as a non-overlapping relationship with the edge coupler 24.

The metal features 32 are positioned along the length of the waveguide core 12 between the edge coupler 24 and the metal features 36. The metal features 36 are positioned in the metallization level between a pair of exclusion areas 64, 66 in each of which the dielectric layer 34 is free of metal features. One of the exclusion areas 64 adjacent to the metal features 36 overlaps with the metal features 32, and the metal features 36 overlap with the exclusion area 62 adjacent to the metal features 32.

Figure 4:
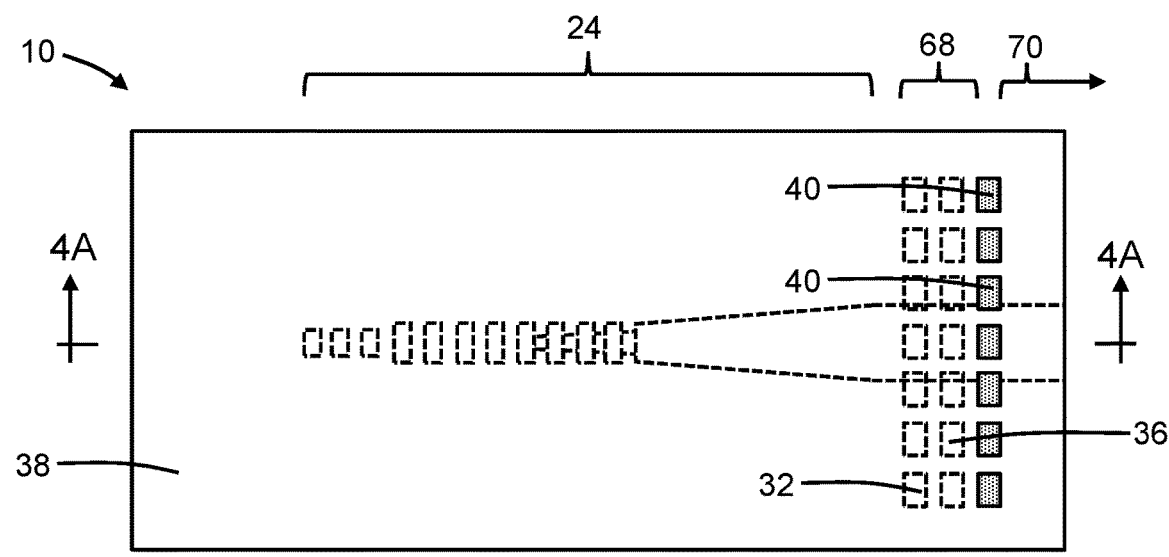
FIG. 4 is a top view of the structure at a fabrication stage of the processing method subsequent to FIG. 3.
Figure 4A:
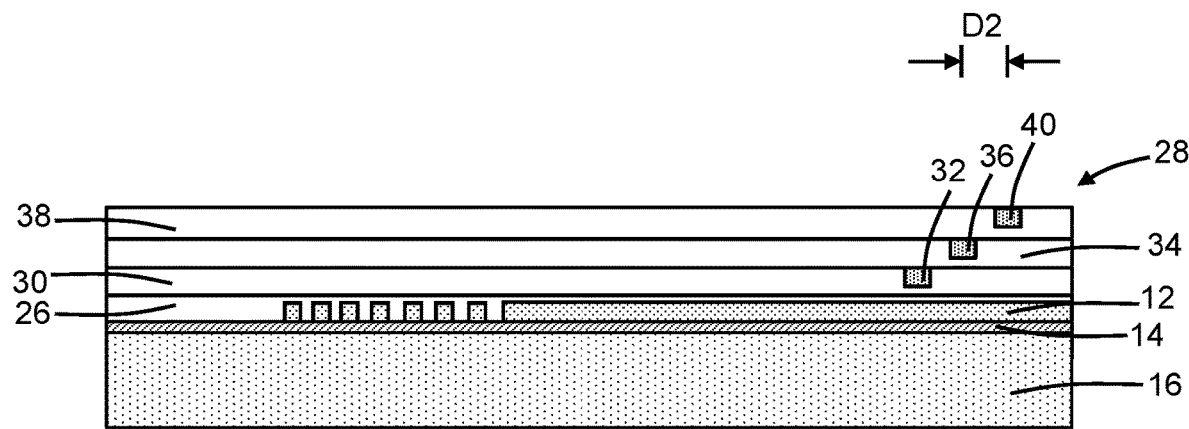
FIG. 4A is a cross-sectional view taken generally along line 4A-4A in FIG. 4.

With reference to FIGS. 4, 4A in which like reference numerals refer to like features in FIGS. 3, 3A and at a subsequent fabrication stage, the back-end-of-line stack 28 may further include a dielectric layer 38 positioned on the dielectric layer 34 and metal features 40 that are formed by, for example, a damascene process as non-functional metal fill in the dielectric layer 38. In an embodiment, the dielectric layer 38 may be comprised of a dielectric material, such as silicon dioxide, and the metal features 40 may be comprised of a metal, such as copper.

The metal features 40 may be arranged in a row, and the metal features 40 may be spaced apart in the row with a given pitch. In an embodiment, the row including the metal features 40 may be aligned parallel or substantially parallel to the row including the metal features 36. In an embodiment, the row including the metal features 40 may be aligned transverse to the length of the waveguide core 12. The metal features 32 and the metal features 36 are positioned in elevation between the metal features 40 and the semiconductor substrate 16. The row including the metal features 40 may be offset by a distance D2 (for example, a center-to-center distance) from the row including the metal features 36. The metal features 40 have a non-overlapping relationship with the metal features 32 and the metal features 36, as well as a non-overlapping relationship with the edge coupler 24.

The metal features 36 are positioned along the length of the waveguide core 12 between the metal features 32 and the metal features 40. The metal features 40 are positioned in the metallization level between a pair of exclusion areas 68, 70 in each of which the dielectric layer 38 is free of metal features. One of the exclusion areas 68 adjacent to the metal features 40 overlaps with the metal features 32 and the metal features 36, and the metal features 40 overlap with the exclusion area 66 adjacent to the metal features 36 and the exclusion area 62 adjacent to the metal features 32.

Figure 5:
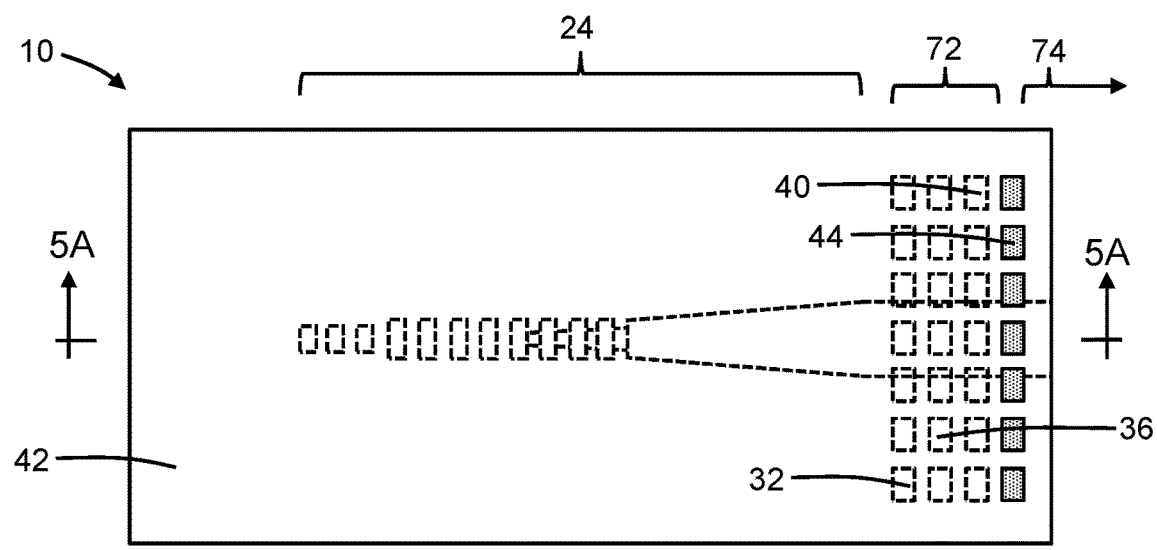
FIG. 5 is a top view of the structure at a fabrication stage of the processing method subsequent to FIG. 4.
Figure 5A:
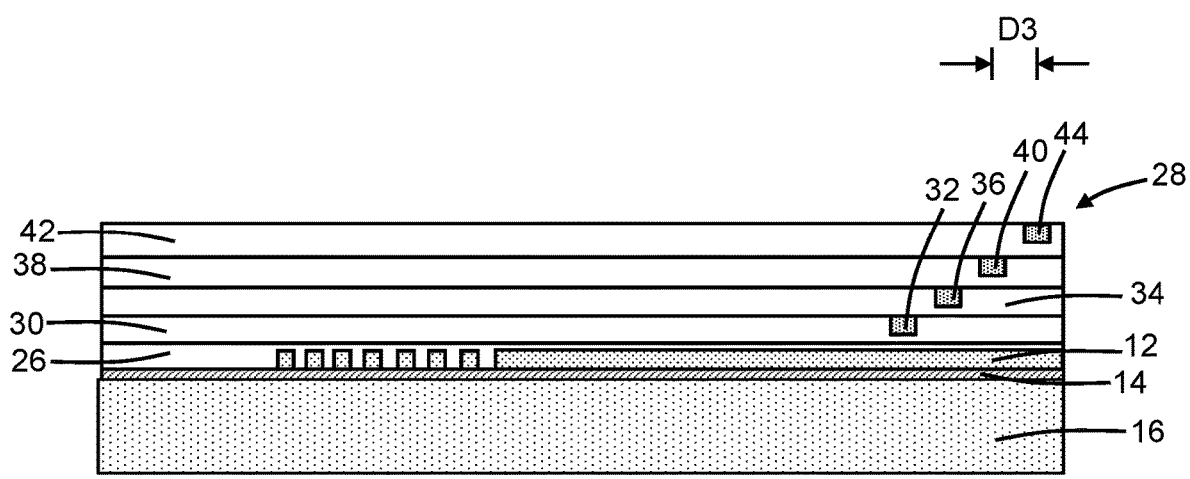
FIG. 5A is a cross-sectional view taken generally along line 5A-5A in FIG. 5.

With reference to FIGS. 5, 5A in which like reference numerals refer to like features in FIGS. 4, 4A and at a subsequent fabrication stage, the back-end-of-line stack 28 may further include a metallization level having a dielectric layer 42 positioned on the dielectric layer 38 and metal features 44 that are formed by, for example, a damascene process as non-functional metal fill in the dielectric layer 42. In an embodiment, the dielectric layer 42 may be comprised of a dielectric material, such as silicon dioxide, and the metal features 44 may be comprised of a metal, such as copper.

The metal features 44 may be arranged in a row, and the metal features 44 may be spaced apart in the row with a given pitch. In an embodiment, the row including the metal features 44 may be aligned parallel or substantially parallel to the row including the metal features 44. In an embodiment, the row including the metal features 44 may be aligned transverse to the length of the waveguide core 12. The metal features 32, the metal features 36, and the metal features 40 are positioned in elevation between the metal features 44 and the semiconductor substrate 16. The row including the metal features 44 in the dielectric layer 42 may be offset by a distance D3 (for example, a center-to-center distance) from the row including the metal features 40 in the dielectric layer 38. The metal features 44 have a non-overlapping relationship with the metal features 32, the metal features 36, and the metal features 40, as well as a non-overlapping relationship with the edge coupler 24.

The metal features 40 are positioned along the length of the waveguide core 12 between the metal features 36 and the metal features 44. The metal features 44 are positioned in the metallization level between a pair of exclusion areas 72, 74 in each of which the dielectric layer 42 is free of metal features. One of the exclusion areas 72 adjacent to the metal features 44 overlaps with the metal features 32, the metal features 36, and the metal features 40, and the metal features 44 overlap with the exclusion area 70 adjacent to the metal features 40, the exclusion area 66 adjacent to the metal features 36, and the exclusion area 62 adjacent to the metal features 32.

Figure 6:
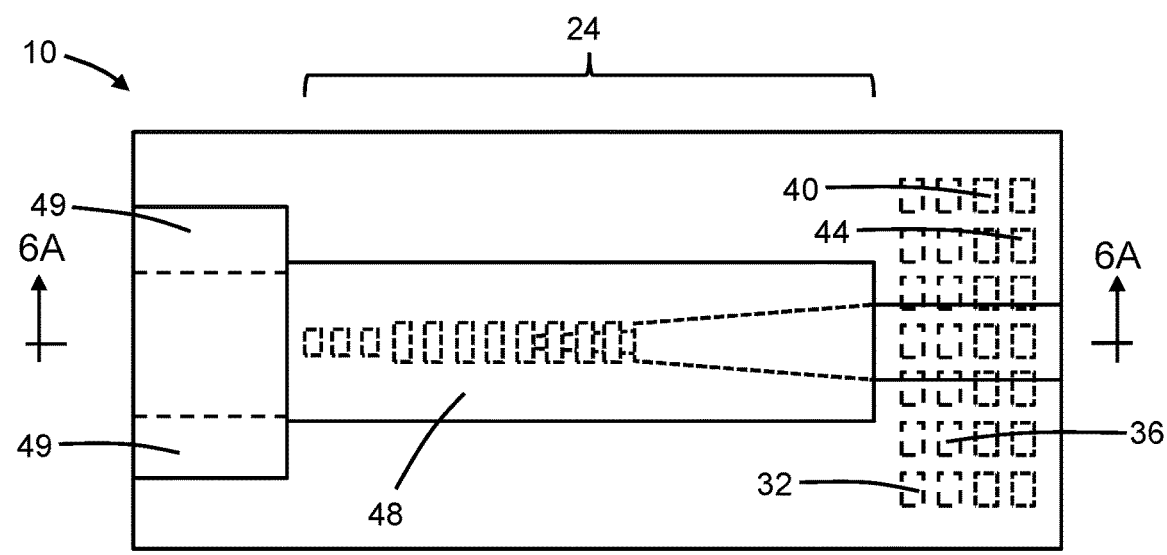
FIG. 6 is a top view of the structure at a fabrication stage of the processing method subsequent to FIG. 5.
Figure 6A:
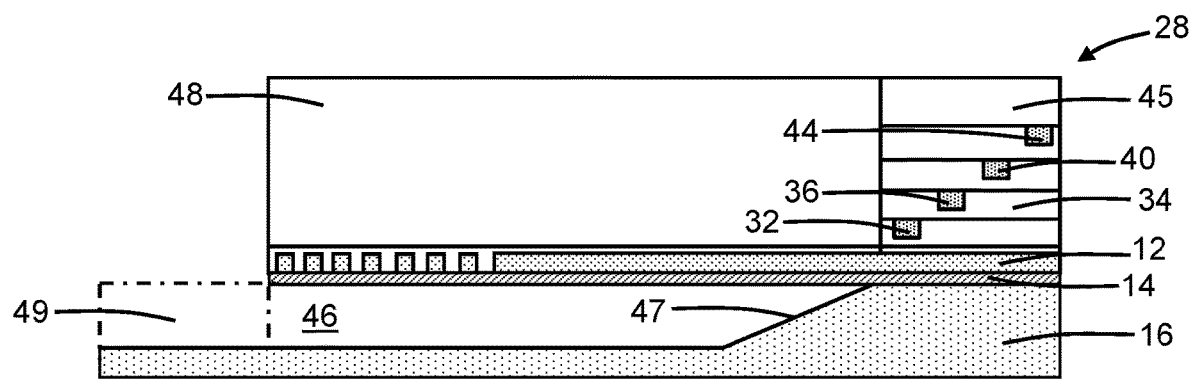
FIG. 6A is a cross-sectional view taken generally along line 6A-6A in FIG. 6.

With reference to FIGS. 6, 6A in which like reference numerals refer to like features in FIGS. 5, 5A and at a subsequent fabrication stage, one or more metallization levels 45 may be formed over the metallization level that includes the dielectric layer 42 and the metal features 44. In an embodiment, each additional metallization levels 45 may lack metal features. In an embodiment, one or more of these additional metallization levels 45 may include metal features that are offset relative to the metal features in the underlying metallization level. In an alternative embodiment, the metallization level including the dielectric layer 42 and metal features 44 may be the topmost metallization level in the back-end-of-line stack 28.

A cavity 46 may be formed in the semiconductor substrate 16 adjacent to the edge coupler 24. A portion of the cavity 46 may extend as an undercut region beneath the dielectric layer 14 such that all or a portion of the edge coupler 24 is suspended over the undercut region. The undercut region of the cavity 46 may function to reduce light loss to the semiconductor substrate 16. The cavity 46 may have inclined sidewalls 49 that are positioned adjacent to the edge coupler 24, and the undercut of the cavity 46 may include an inclined sidewall 47 that is positioned adjacent to the metal features 32, 36, 40, 44.

A dielectric layer 48 may be formed over all or a portion of the edge coupler 24 to replace a portion of the back-end-of-line stack 28. The dielectric layer 48 may be comprised of a homogenous dielectric material, such as silicon dioxide.

Figure 7:
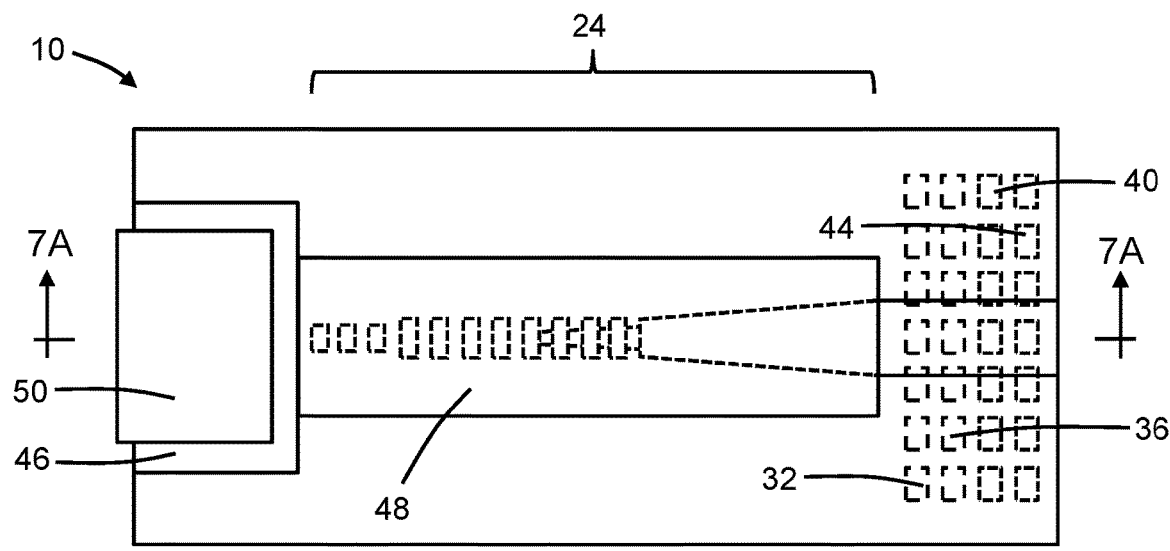
FIG. 7 is a top view of the structure at a fabrication stage of the processing method subsequent to FIG. 6.
Figure 7A:
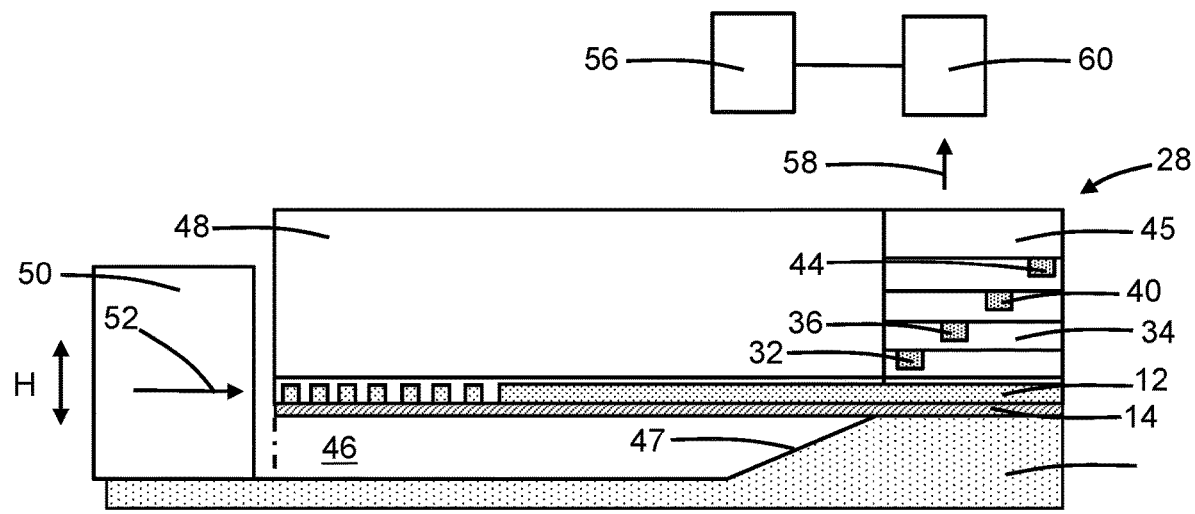
FIG. 7A is a cross-sectional view taken generally along line 7A-7A in FIG. 7.

With reference to FIGS. 7, 7A in which like reference numerals refer to like features in FIGS. 6, 6A and at a subsequent fabrication stage, a light source 50 may be placed into the cavity 46. In an embodiment, the light source 50 may be an optical fiber that includes a tip inserted into the cavity 46 adjacent to the edge coupler 24. The inclined sidewalls 49 (FIGS. 6, 6A) of the cavity 46 may contact the outer surface of the light source 50 as the light source 50 is inserted into the cavity 46 such that a light output 52 of the light source 50 is self-aligned with the edge coupler 24. The position of the light source 50 in the cavity 46 can be adjusted based upon various build factors, such as the width of the cavity 46, the height of the cavity 46, the size of the light source 50, and active alignment of the light source 50.

In an embodiment, the optical fiber defining the light source 50 may output light in an infrared wavelength range. In alternative embodiments, the light source 50 may be a single-mode optical fiber, a polarization-maintaining optical fiber, a multiple-mode optical fiber, or a multiple-core optical fiber. In an alternative embodiment, the light source 50 may be a laser chip that includes a semiconductor laser configured to output light from the light output 52 in an infrared wavelength range. In an embodiment, the laser chip may include a laser comprised of III-V compound semiconductor materials. In an embodiment, the laser chip may include an indium phosphide/indium-gallium-arsenic phosphide laser that is configured to generate continuous laser light in an infrared wavelength range.

The metal features 32, 36, 40, 44 may be used to detect the alignment between the light output from the light source 50 and the edge coupler 24. In that regard, the metal features 32, 36, 40, 44 may be configured to redirect a portion of the light external of the photonics chip. In an embodiment, the metal features 32, 36, 40, 44 may be configured to redirect the light as a function of an alignment between the light output 52 and the edge coupler 24. In an embodiment, the metal features 32, 36, 40, 44 may be placed as non-overlapping steps in a staircase pattern in which the adjacent rows are tiered in order to detect the vertical placement of the light output 52 relative to the edge coupler 24.

In an embodiment, the metal features 32, 36, 40, 44 may be used to determine any misalignment in the height placement of the light source 50, and its light output 52, in the cavity 46 relative to the edge coupler 24. For example, the metal features 32, 36, 40, 44 may redirect (i.e., scatter) light in a unique signature corresponding to the height placement inside the cavity 46. The signature may vary based on the height H of the light output 52 of the light source 50 in the cavity 46 relative to the edge coupler 24.

Light (e.g., infrared light) from the light source 50 is coupled into the edge coupler 24. The edge coupler 24 supports mode transformation and mode size variation during the transfer of the light from the light source 50 to the edge coupler 24. For example, the edge coupler 24 may provide a mode size conversion for light received from an optical fiber from a large diameter (e.g., 9 microns) to a small diameter (e.g., 220 nanometers). When the light source 50 is optimally positioned inside the cavity 46, a majority of the light (e.g., infrared light) output from the light source couples from the light output 52 into the edge coupler 24. Due to the large mode size, portions of the light are positioned above and below the primary light path between the light output 52 of the light source 50 and the edge coupler 24.

The portion of the light above the primary light path eventually encounters the metal features 32, 36, 40, 44 and is redirected in a light path generally indicated by the single-headed arrow 58. The interaction of this portion of light with the metal features 32, 36, 40, 44 may be detected by an infrared camera 60 that is placed adjacent to the metal features 32, 36, 40, 44. For example, light may be redirected by from the metal features 32, 36, 40, 44 within a field-of-view of the infrared camera 60. In an embodiment, the infrared camera 60 may be placed above the portion of the back-end-of-line stack 25 with the field-of-view aimed at the metal features 32, 36, 40, 44.

The magnitude of the interaction of the light with the metal features 32, 36, 40, 44 provides an indication of whether the light source 50 is optimally positioned inside the cavity 46, the light source 50 is positioned above the optimal position, or the light source 50 is positioned below the optimal position. If the light source 50 is positioned above the optimal position, the magnitude and size of the redirected light in the image may increase in comparison with the image for optimal positioning used as a reference. The magnitude and size of the redirected light may increase with increasing misalignment above the optimal position because the interaction of the light with the metal features 32, 36, 40, 44 progressively increases. If the light source 50 is positioned below the optimal position, the magnitude and size of the redirected light in the image may decrease in comparison with the image for optimal positioning used as a reference. The magnitude and size of the redirected light may decrease with increasing misalignment below the optimal position because the interaction of the light with the metal features 32, 36, 40, 44 progressively decreases. The signature in an image generated from the redirected light may be used for diagnostic purposes to detect the placement, such as the height placement, of the light source 50.

The metal features 32, 36, 40, 44 may have a non-regular spacing in the staircase pattern. The non-regular spacing of the metal features 32, 36, 40, 44 adjacent to the edge coupler 24, as well as the non-overlapping relationships, differs from the regularly-spaced and overlapping non-functional metal fill found in the metallization levels of conventional back-end-of-line stacks. The non-regular spacing of the metal features 32, 36, 40, 44 and the non-overlapping relationship of the metal features 32, 36, 40, 44 enables the redirection of light for detection by the infrared camera 60.

In an embodiment, a photonics chip may be manufactured with a series of cavities 46 that are fabricated with a series of widths that are systematically different, an edge coupler 24 adjacent to each cavity 46, and a set of the metal features 32, 36, 40, 44 adjacent to each edge coupler 24. For example, the set of cavities 46 may progressively increase in width by a fixed amount among the different cavities 46 from a minimum value to a maximum value. A light source 50 may be placed into each cavity 46. Due to the different cavity widths, the light output 52 of each light source 50 will rest in the cavity 46 with a known height placement and spatial relationship with the corresponding edge coupler 24. Light from each light source 50 may be sequentially supplied to the associated edge coupler 24, and an image may be acquired by the infrared camera 60 by collecting the light redirected by the metal features 32, 36, 40, 44. For example, the light supplied from each light source 50 may have a fixed input power and a fixed polarization, such as a transverse electric polarization. Each image contains a signature for the redirected light that can be correlated with the known positions, such as height placement, for the light sources 50. The images may be stored as entries in a database with a mapping to the known positions.

A machine language model may be trained on a computer 56 based on the images and known positions stored in the database. In an embodiment, the machine language model may be a supervised learning algorithm that is presented with the images as inputs and the known positions as outputs. The supervised learning algorithm executing on the computer 56 learns one or more rules that map the inputs to the outputs. The supervised learning algorithm executing on the computer 56 may mathematically build the machine language model based on the set of training data in the database that contains both the images as inputs and the known positions as outputs. After the machine language model is trained, the supervised learning algorithm executing on the computer 56 may determine a position as an output for an input image that was not a part of the set of training data. In that regard, the trained machine language model may be used to analyze freshly-manufactured photonics chips for fast diagnosis and feedback on the fiber height placement. The supervised learning algorithm may be configured to improve the accuracy of its outputs over time by incorporating fresh images associated with known positions as additional entries in the database.

The computer 56, which may be coupled to the infrared camera 60 and may be coupled to the database containing the training data, may include at least one processing unit and a memory storage device that is coupled to the at least one processing unit. The memory storage device may be a non-transitory computer-readable storage medium comprising computer-readable instructions that, upon execution by the at least one processor, cause the computer 56 to train the supervised learning algorithm and to use the supervised learning algorithm to determine the fiber height placement for freshly-manufactured photonics chips.

Figure 8:
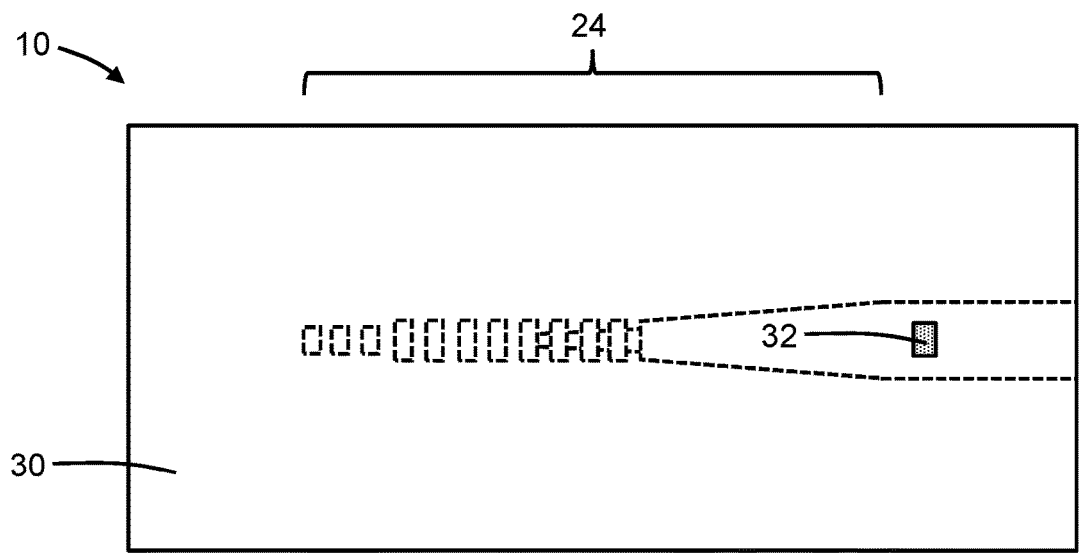
FIG. 8 is a top view of a structure at an initial fabrication stage of a processing method in accordance with embodiments of the invention.

With reference to FIG. 8 and in accordance with alternative embodiments, the metal features 32 may be formed in the back-end-of-line stack 28 with a different pattern than a row. In an embodiment, a single metal feature 32 may be formed in the dielectric layer 30 instead of a row of metal features 32. The metal feature 32 may have a non-overlapping relationship with the edge coupler 24.

Figure 9:
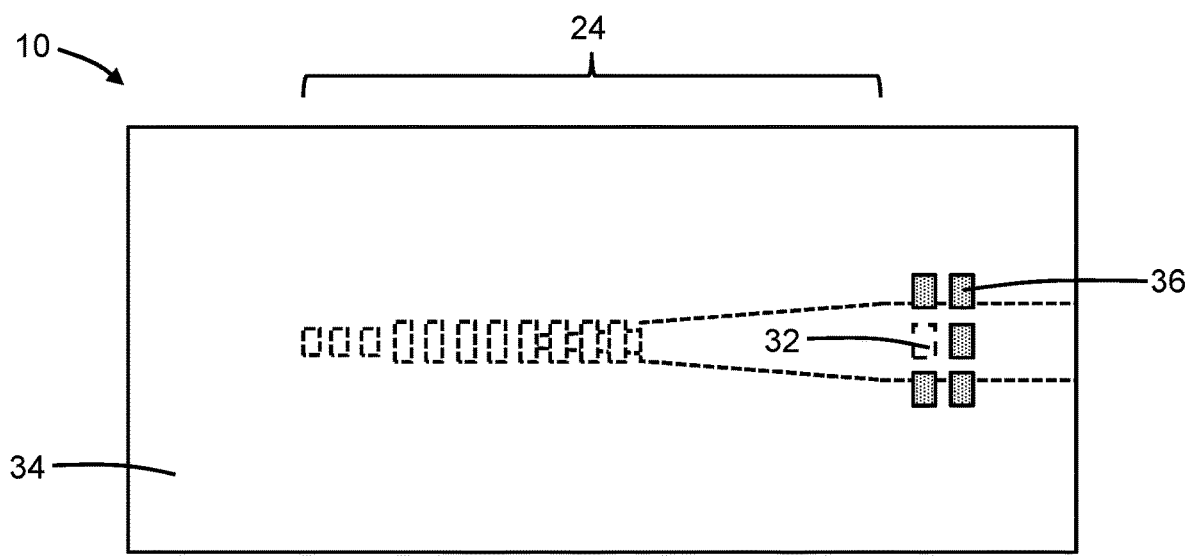
FIG. 9 is a top view of the structure at a fabrication stage subsequent to FIG. 8.

With reference to FIG. 9 in which like reference numerals refer to like features in FIG. 8 and at a subsequent fabrication stage, the metal features 36 may be formed in the back-end-of-line stack 28 with a different pattern than a row. In that regard, the metal features 36, which are positioned in a different elevation in the back-end-of-line stack 28 than the metal feature 32, may be offset from the metal feature 32 in multiple directions. The metal features 36 may be placed on multiple sides of the metal feature 32. The metal features 36 may have a non-overlapping relationship with the metal feature 32, as well as with the edge coupler 24. The metal features 36 may overlap with an exclusion area adjacent to the metal feature 32.

Figure 10:
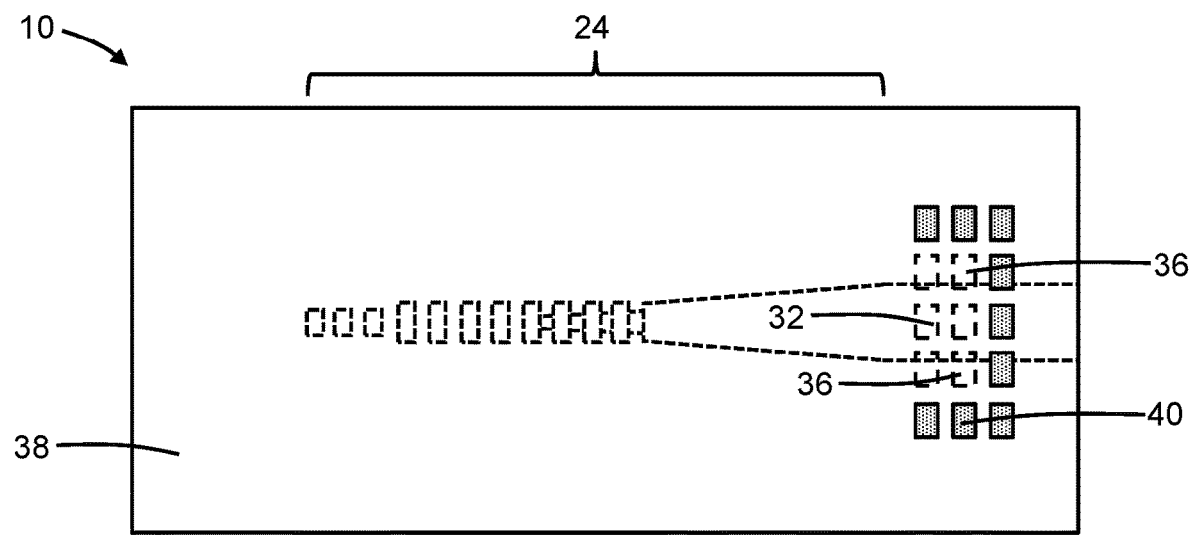
FIG. 10 is a top view of the structure at a fabrication stage subsequent to FIG. 9.

With reference to FIG. 10 in which like reference numerals refer to like features in FIG. 9 and at a subsequent fabrication stage, the metal features 40 may be formed in the back-end-of-line stack 28 with a different pattern than a row. In that regard, the metal features 40, which are positioned in a different elevation in the back-end-of-line stack 28 than the metal features 36, may be offset from the metal features 36 in multiple directions. The metal features 40 may be placed on multiple sides of the metal features 36. The metal features 40 may have a non-overlapping relationship with the metal features 36, as well as with the edge coupler 24. The metal features 40 may overlap with an exclusion area adjacent to the metal features 36.

Figure 11:
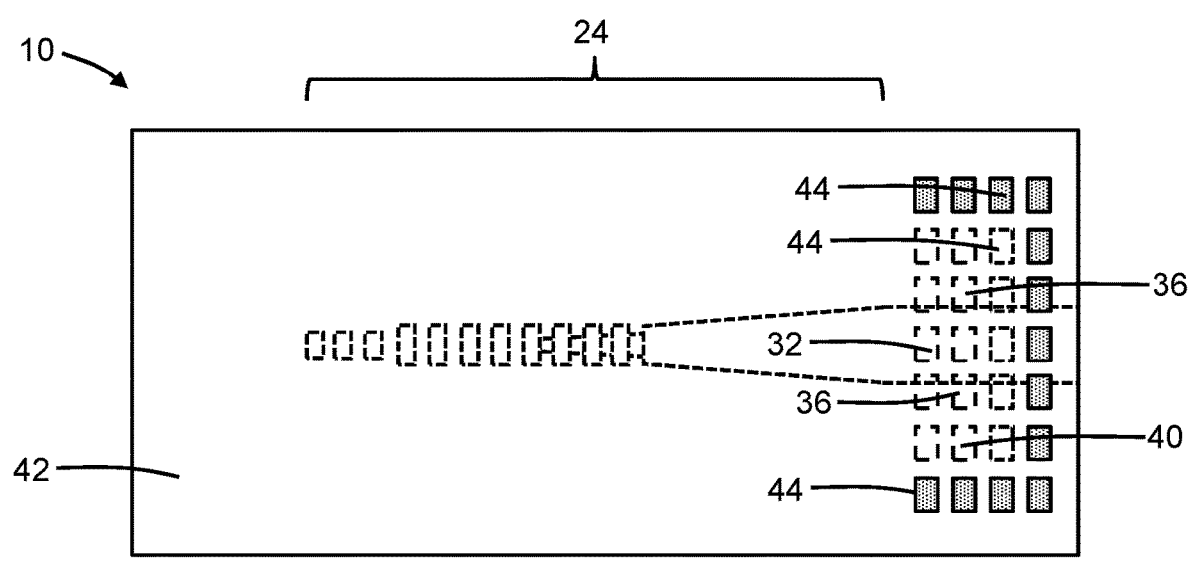
FIG. 11 is a top view of the structure at a fabrication stage subsequent to FIG. 10.

With reference to FIG. 11 in which like reference numerals refer to like features in FIG. 10 and at a subsequent fabrication stage, the metal features 44 may be formed in the back-end-of-line stack 28 with a different pattern than a row. In that regard, the metal features 44, which are positioned in a different elevation in the back-end-of-line stack 28 than the metal features 40, may be offset from the metal features 40 in multiple directions. The metal features 44 may be placed on multiple sides of the metal features 40. The metal features 44 may have a non-overlapping relationship with the metal features 40, as well as with the edge coupler 24. The metal features 44 may overlap with an exclusion area adjacent to the metal features 40.

Processing continues as described in connection with FIGS. 6, 6A.

The metal features 32, 36, 40, 44 of FIGS. 8-11 are placed in a staggered pattern. In an embodiment, the metal features 32, 36, 40, 44 in the different metallization levels may be placed in the staggered pattern in order to detect the placement of the light output 52 relative to the edge coupler 24 in multiple directions.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
a semiconductor substrate;
a back-end-of-line stack on the semiconductor substrate, the back-end-of-line stack including a first dielectric layer, a first plurality of metal features in the first dielectric layer, a second dielectric layer on the first dielectric layer, and a second plurality of metal features in the second dielectric layer, the second plurality of metal features having a non-overlapping relationship with the first plurality of metal features;
an edge coupler adjacent to the first plurality of metal features and the second plurality of metal features; and
a light source configured to supply light to the edge coupler, the light source having a light output,
wherein the edge coupler is positioned between the light source and the first plurality of metal features, the second plurality of metal features are positioned between the edge coupler and the first plurality of metal features, the first plurality of metal features and the second plurality of metal features are configured to redirect a portion of the light from the light source out of the photonics chip for detection, and the first plurality of metal features and the second plurality of metal features are configured to redirect the portion of the light as a function of an alignment between the light output and the edge coupler.

2. The structure of claim 1 wherein the first dielectric layer is free of metal features in an exclusion area adjacent to the first plurality of metal features, and the second plurality of metal features overlap with the exclusion area.

3. The structure of claim 1 wherein the second dielectric layer is free of metal features in an exclusion area adjacent to the second plurality of metal features, and the exclusion area overlaps with the first plurality of metal features.

4. The structure of claim 1 wherein the first plurality of metal features are arranged in a first row, the second plurality of metal features are arranged in a second row, the second plurality of metal features in the second row have a non-overlapping relationship with the first plurality of metal features the first row, and the first plurality of metal features in the first row are arranged between the second plurality of metal features in the second row and the edge coupler.

5. The structure of claim 1 wherein the light source is an optical fiber.

6. The structure of claim 1 wherein the light source is a laser chip.

7. The structure of claim 1 wherein the semiconductor substrate includes a cavity, and the light source is positioned inside the cavity.

8. The structure of claim 1 wherein the first plurality of metal features and the second plurality of metal features are configured to redirect the portion of the light for detection of a vertical placement of the light output relative to the edge coupler.

9. The structure of claim 8 wherein the first plurality of metal features and the second plurality of metal features are placed in a staircase pattern.

10. The structure of claim 1 wherein the first plurality of metal features and the second plurality of metal features are configured to redirect the portion of the light for detection in multiple dimensions of placement of the light output relative to the edge coupler.

11. The structure of claim 10 wherein the first plurality of metal features and the second plurality of metal features are placed in a staggered pattern.

12. The structure of claim 1 wherein the first plurality of metal features and the second plurality of metal features comprise copper.

13. The structure of claim 1 wherein the first dielectric layer and the second dielectric layer comprise silicon dioxide.

14. The structure of claim 1 wherein the edge coupler comprises silicon.

15. The structure of claim 1 wherein the edge coupler includes a plurality of segments.

16. The structure of claim 1 wherein the edge coupler is connected to a photonic integrated circuit on the photonics chip.

17. The structure of claim 1 wherein the edge coupler comprises a waveguide core, the first dielectric layer is free of metal features in an exclusion area adjacent to the first plurality of metal features, and the first plurality of metal features are positioned along a length of the waveguide core between the edge coupler and the exclusion area.

18. The structure of claim 4 wherein the edge coupler comprises a waveguide core, the first row is aligned transverse to a length of the waveguide core, and the second row is aligned transverse to a length of the waveguide core.

19. The structure of claim 4 wherein the first row is offset from the second row.

20. A method of forming a photonics chip, the method comprising:
   forming an edge coupler on a semiconductor substrate;
   forming a first dielectric layer of a back-end-of-line stack on the semiconductor substrate;
   forming a first plurality of metal features of the back-end-of-line stack in the first dielectric layer;
   forming a second dielectric layer of the back-end-of-line stack on the first dielectric layer; and
   forming a second plurality of metal features of the back-end-of-line stack in the second dielectric layer,
   wherein the second plurality of metal features have a non-overlapping relationship with the first plurality of metal features, and the edge coupler is formed adjacent to the first plurality of metal features and the second plurality of metal features, a light source is configured to supply light to the edge coupler, the light source has a light output, the edge coupler is positioned between the light source and the first plurality of metal features, the second plurality of metal features are positioned between the edge coupler and the first plurality of metal features, the first plurality of metal features and the second plurality of metal features are configured to redirect a portion of the light from the light source out of the photonics chip for detection, and the first plurality of metal features and the second plurality of metal features are configured to redirect the portion of the light as a function of an alignment between the light output and the edge coupler.

* * * * *